(12) United States Patent
Burgard et al.

(10) Patent No.: US 11,328,590 B2
(45) Date of Patent: May 10, 2022

(54) SYSTEM AND METHOD FOR INTERNET RADIO AUTOMATIC CONTENT MANAGEMENT

(71) Applicant: InterNetwork Media, LLC, Greenwich, CT (US)

(72) Inventors: Clark Burgard, Greenwich, CT (US); Robert H. Bayne, III, Norwalk, CT (US)

(73) Assignee: Internetwork Media, LLC, Greenwich, CT (US)

(*) Notice: Subject to any disclaimer, the term of this patent is extended or adjusted under 35 U.S.C. 154(b) by 0 days.

(21) Appl. No.: 15/339,866

(22) Filed: Oct. 31, 2016

(65) Prior Publication Data
US 2017/0132921 A1 May 11, 2017

Related U.S. Application Data

(60) Provisional application No. 62/247,777, filed on Oct. 29, 2015.

(51) Int. Cl.
G06F 15/16 (2006.01)
H04L 29/08 (2006.01)
H04N 21/254 (2011.01)
H04N 21/266 (2011.01)
H04L 29/06 (2006.01)
G08G 1/09 (2006.01)
H04M 1/72457 (2021.01)
(Continued)

(52) U.S. Cl.
CPC ........ G08G 1/093 (2013.01); H04M 1/72457 (2021.01); H04M 1/72412 (2021.01); H04M 1/72442 (2021.01)

(58) Field of Classification Search
CPC ..... G08G 1/093; H04L 67/42; H04M 1/72572
USPC .......................................... 709/219, 23, 245
See application file for complete search history.

(56) References Cited

U.S. PATENT DOCUMENTS 6,006,257 A 12/1999 Slezak
6,014,634 A 1/2000 Scroggie et al.
(Continued)

FOREIGN PATENT DOCUMENTS

AU 2013361219 A1 * 7/2015 ............. H04N 19/40
GB 3313080 A1 * 11/2010 ........... H04N 21/258
(Continued)

OTHER PUBLICATIONS

"Another Net Radio Service Launches: iNetRadio" https://www.allaccess.com/net-news/archive/story/87347/another-net-radio-service-launches-inetradio.
(Continued)

Primary Examiner — David R Lazaro
Assistant Examiner — Berhanu Shitayewoldetadik
(74) Attorney, Agent, or Firm — Ferdinand IP, LLC

(57) ABSTRACT

A system and method for playing a sequence of items including certain selected items of content. A media player operating on a computing device plays the content that is received over a network from a content server. The user controls the media player using a user interface, and further controls the content that is desired. An auto-content selector allows the user to select content related to a particular subject matter like weather and traffic that is automatically added to the sequence of items to be played based on detected information about the user such as the user's location.

19 Claims, 14 Drawing Sheets

(51) Int. Cl.
*H04M 1/72412* (2021.01)
*H04M 1/72442* (2021.01)

(56) References Cited

U.S. PATENT DOCUMENTS

| | | | |
|---|---|---|---|
| 6,604,108 B1* | 8/2003 | Nitahara | G06F 16/283 |
| 6,954,763 B2* | 10/2005 | Nunome | G06F 16/64 |
| 7,055,165 B2 | 5/2006 | Connelly | |
| 7,076,561 B1* | 7/2006 | Rosenberg | G11B 27/034 |
| | | | 709/231 |
| 7,349,663 B1 | 3/2008 | Joseph | |
| 8,225,310 B1* | 7/2012 | Robertson | G06F 9/44521 |
| | | | 717/177 |
| 8,307,110 B1* | 11/2012 | Katzer | H04L 12/1859 |
| | | | 709/232 |
| 8,547,834 B1* | 10/2013 | Reeves | H04W 40/20 |
| | | | 370/230 |
| 9,003,474 B1* | 4/2015 | Smith | G06F 21/606 |
| | | | 726/1 |
| 9,026,145 B1* | 5/2015 | Duleba | H04L 61/609 |
| | | | 455/456.3 |
| 9,602,619 B1* | 3/2017 | Eldawy | H04L 67/2847 |
| 9,747,390 B2* | 8/2017 | Cooper | G06F 40/242 |
| 9,852,176 B2* | 12/2017 | Montana | G06F 16/282 |
| 10,789,315 B1* | 9/2020 | Zoller | G06F 16/34 |
| 11,049,349 B2 | 6/2021 | Onischuk | G07C 13/00 |
| 2002/0082730 A1* | 6/2002 | Capps | H04N 21/40 |
| | | | 700/94 |
| 2002/0133374 A1* | 9/2002 | Agoni | G06Q 10/10 |
| | | | 705/2 |
| 2003/0048299 A1 | 3/2003 | Stern | |
| 2003/0065790 A1* | 4/2003 | Loveland | H04L 67/26 |
| | | | 709/228 |
| 2003/0093790 A1 | 5/2003 | Logan et al. | |
| 2003/0236582 A1* | 12/2003 | Zamir | H04N 21/4532 |
| | | | 700/94 |
| 2004/0239622 A1* | 12/2004 | Proctor | G06F 3/03547 |
| | | | 345/156 |
| 2005/0021470 A1* | 1/2005 | Martin | G11B 27/002 |
| | | | 705/51 |
| 2005/0033657 A1* | 2/2005 | Herrington | G06Q 30/0631 |
| | | | 705/26.7 |
| 2005/0050460 A1* | 3/2005 | Bedingfield | G06F 16/958 |
| | | | 715/205 |
| 2005/0146534 A1* | 7/2005 | Fong | G11B 19/16 |
| | | | 345/619 |
| 2005/0165843 A1* | 7/2005 | Capps | H04N 21/40 |
| 2005/0198397 A1* | 9/2005 | Park | H04L 67/24 |
| | | | 709/248 |
| 2005/0238046 A1 | 10/2005 | Hassan et al. | |
| 2006/0014569 A1* | 1/2006 | DelGiorno | H04M 9/04 |
| | | | 455/567 |
| 2006/0136967 A1* | 6/2006 | Hellman | G11B 27/105 |
| | | | 725/62 |
| 2006/0161635 A1* | 7/2006 | Lamkin | G06F 16/4387 |
| | | | 709/217 |
| 2006/0163358 A1* | 7/2006 | Biderman | H04L 67/02 |
| | | | 235/472.01 |
| 2006/0218294 A1* | 9/2006 | Rosenberg | H04L 12/1859 |
| | | | 709/231 |
| 2006/0227673 A1* | 10/2006 | Yamashita | G11B 19/022 |
| | | | 369/30.08 |
| 2007/0044121 A1* | 2/2007 | Parekh | H04N 21/84 |
| | | | 725/45 |
| 2007/0067309 A1* | 3/2007 | Klein | G06Q 30/0635 |
| 2007/0073845 A1* | 3/2007 | Reisman | G06Q 10/067 |
| | | | 709/219 |
| 2007/0118590 A1* | 5/2007 | Giacalone | H04N 21/26258 |
| | | | 709/201 |
| 2007/0186235 A1* | 8/2007 | Jarman | H04N 7/163 |
| | | | 725/28 |
| 2007/0214182 A1* | 9/2007 | Rosenberg | G11B 27/11 |
| 2007/0219979 A1 | 9/2007 | Jung et al. | |
| 2007/0220552 A1* | 9/2007 | Juster | H04N 21/47202 |
| | | | 725/46 |
| 2007/0250445 A1* | 10/2007 | Ache | H04N 21/8355 |
| | | | 705/51 |
| 2007/0255844 A1* | 11/2007 | Shen | H04L 65/604 |
| | | | 709/231 |
| 2008/0010372 A1* | 1/2008 | Khedouri | G06F 16/1834 |
| | | | 709/224 |
| 2008/0059631 A1* | 3/2008 | Bergstrom | H04L 67/1072 |
| | | | 709/224 |
| 2008/0077264 A1 | 3/2008 | Irvin et al. | |
| 2008/0098301 A1* | 4/2008 | Black | H04L 67/1023 |
| | | | 715/246 |
| 2008/0104106 A1* | 5/2008 | Rosenberg | G06F 16/686 |
| 2008/0160908 A1* | 7/2008 | Khedouri | H04N 21/4788 |
| | | | 455/3.06 |
| 2008/0175569 A1* | 7/2008 | Johnson | G11B 27/10 |
| | | | 386/232 |
| 2008/0177860 A1* | 7/2008 | Khedouri | H04N 21/47202 |
| | | | 709/217 |
| 2008/0189295 A1* | 8/2008 | Khedouri | G11B 27/034 |
| 2008/0242280 A1* | 10/2008 | Shapiro | H04N 21/41407 |
| | | | 455/414.3 |
| 2008/0243880 A1* | 10/2008 | Petri | G06F 16/93 |
| 2009/0019492 A1* | 1/2009 | Grasset | G06F 16/178 |
| | | | 725/45 |
| 2009/0063419 A1* | 3/2009 | Nurminen | G06F 16/1834 |
| 2009/0240721 A1* | 9/2009 | Giacalone, Jr. | G06Q 30/0264 |
| 2009/0248182 A1* | 10/2009 | Logan | H04N 21/44204 |
| | | | 700/94 |
| 2009/0313265 A1* | 12/2009 | Sifry | G06F 16/285 |
| 2009/0319574 A1* | 12/2009 | Burgard | H04H 20/82 |
| 2010/0042654 A1* | 2/2010 | Heller | G11B 27/034 |
| | | | 709/242 |
| 2010/0100899 A1* | 4/2010 | Bradbury | G06Q 30/08 |
| | | | 725/29 |
| 2010/0104269 A1* | 4/2010 | Prestenback | H04N 21/4331 |
| | | | 386/334 |
| 2010/0115119 A1* | 5/2010 | Gallo | G06F 16/9577 |
| | | | 709/230 |
| 2010/0131527 A1* | 5/2010 | Wohlert | G06F 16/435 |
| | | | 707/758 |
| 2010/0161091 A1* | 6/2010 | Takatsuka | G06F 16/686 |
| | | | 700/94 |
| 2010/0241663 A1* | 9/2010 | Huang | H04M 1/2757 |
| | | | 707/770 |
| 2010/0281108 A1* | 11/2010 | Cohen | H04N 21/458 |
| | | | 709/203 |
| 2010/0332567 A1* | 12/2010 | Samadani | G06F 16/4387 |
| | | | 707/912 |
| 2010/0333145 A1* | 12/2010 | Chen | H04N 21/4143 |
| | | | 725/61 |
| 2011/0106283 A1* | 5/2011 | Robinson | G07F 17/16 |
| | | | 700/94 |
| 2011/0196826 A1* | 8/2011 | Retief | H04L 67/325 |
| | | | 707/621 |
| 2011/0197124 A1* | 8/2011 | Garaventa | G06F 16/972 |
| | | | 715/234 |
| 2011/0320402 A1* | 12/2011 | Agampodi | G06F 16/60 |
| | | | 707/618 |
| 2012/0117588 A1* | 5/2012 | McCoy | H04N 21/4753 |
| | | | 725/28 |
| 2012/0124630 A1* | 5/2012 | Wellen | H04N 21/8133 |
| | | | 725/109 |
| 2012/0173610 A1* | 7/2012 | Bleau | H04L 12/4625 |
| | | | 709/203 |
| 2012/0206317 A1* | 8/2012 | Wong | G06F 21/10 |
| | | | 345/1.1 |
| 2012/0257560 A1* | 10/2012 | Srinivasan | H04L 67/2842 |
| | | | 370/312 |
| 2012/0289253 A1* | 11/2012 | Haag | H04L 67/18 |
| | | | 455/456.2 |
| 2012/0290648 A1* | 11/2012 | Sharkey | H04N 21/4524 |
| | | | 709/204 |
| 2012/0296782 A1* | 11/2012 | Tsai | G06Q 30/02 |
| | | | 705/28 |

(56) References Cited

U.S. PATENT DOCUMENTS

| | | | | |
|---|---|---|---|---|
| 2013/0014181 A1* | 1/2013 | De Vaan | H04N 21/458 | 725/58 |
| 2013/0097115 A1* | 4/2013 | Savage | G06F 16/14 | 707/610 |
| 2013/0097302 A9* | 4/2013 | Khedouri | H04N 21/47202 | 709/224 |
| 2013/0144915 A1* | 6/2013 | Ravi | G06F 16/437 | 707/785 |
| 2013/0151339 A1* | 6/2013 | Kim | G06Q 30/02 | 705/14.55 |
| 2013/0173035 A1* | 7/2013 | Fadell | G06F 1/1632 | 700/94 |
| 2013/0218961 A1* | 8/2013 | Ho | H04L 12/1822 | 709/204 |
| 2013/0227038 A1* | 8/2013 | Rich | H04L 51/36 | 709/206 |
| 2013/0254308 A1* | 9/2013 | Rose | H04N 21/252 | 709/206 |
| 2014/0006951 A1* | 1/2014 | Hunter | H04N 21/431 | 715/719 |
| 2014/0045586 A1* | 2/2014 | Allen | G07F 17/323 | 463/25 |
| 2014/0046988 A1* | 2/2014 | Kojima | G06F 16/182 | 707/827 |
| 2014/0101304 A1* | 4/2014 | Webster | H04L 29/08099 | 709/224 |
| 2014/0115117 A1* | 4/2014 | Fiedler | H04N 21/6125 | 709/219 |
| 2014/0122493 A1* | 5/2014 | Sifry | G06F 16/958 | 707/738 |
| 2014/0126441 A1* | 5/2014 | Rai | H04W 52/0216 | 370/311 |
| 2014/0188911 A1* | 7/2014 | Skeen | G06F 16/639 | 707/754 |
| 2014/0228045 A1* | 8/2014 | Belmonte | H04W 4/021 | 455/456.1 |
| 2014/0280518 A1* | 9/2014 | Giacalone, Jr. | H04H 60/64 | 709/203 |
| 2014/0304756 A1* | 10/2014 | Fletcher | H04N 21/2225 | 725/115 |
| 2014/0347181 A1* | 11/2014 | Luna | H04M 1/72454 | 340/539.22 |
| 2014/0372038 A1* | 12/2014 | LeBlanc | G01C 21/3461 | 702/3 |
| 2015/0026820 A1* | 1/2015 | Arana | G06F 21/10 | 726/27 |
| 2015/0039601 A1* | 2/2015 | Harrang | G06F 16/951 | 707/727 |
| 2015/0046267 A1* | 2/2015 | MacTiernan | G06F 16/635 | 705/14.66 |
| 2015/0072714 A1* | 3/2015 | Froehlich | H04W 4/023 | 455/457 |
| 2015/0074191 A1* | 3/2015 | Feng | H04L 63/102 | 709/204 |
| 2015/0146611 A1* | 5/2015 | Joshi | H04L 41/5029 | 370/328 |
| 2015/0163268 A1* | 6/2015 | Wegman | G06F 9/4451 | 709/203 |
| 2015/0188967 A1* | 7/2015 | Paulauskas | H04L 67/306 | 709/219 |
| 2015/0193120 A1* | 7/2015 | Leventhal | G06F 3/04817 | 715/765 |
| 2015/0271234 A1* | 9/2015 | O'Malley | H04N 21/8456 | 709/219 |
| 2015/0301693 A1* | 10/2015 | Wheeler | G06Q 30/0255 | 715/716 |
| 2015/0304265 A1* | 10/2015 | Vincent | H04L 51/24 | 709/206 |
| 2015/0331599 A1* | 11/2015 | Berger | G06F 3/04847 | 715/716 |
| 2016/0001174 A1* | 1/2016 | Mott | A63F 13/822 | 463/9 |
| 2016/0028788 A1* | 1/2016 | Panguluri | H04L 67/42 | 709/203 |
| 2016/0029095 A1* | 1/2016 | Poniatowski | G06F 16/335 | 725/58 |
| 2016/0057469 A1* | 2/2016 | Morris | G11B 27/102 | 725/25 |
| 2016/0062569 A1* | 3/2016 | Jenkins | H04N 21/43615 | 715/716 |
| 2016/0065637 A1* | 3/2016 | O'Malley | H04L 67/22 | 709/231 |
| 2016/0165038 A1* | 6/2016 | Lim | G06Q 10/109 | 715/728 |
| 2016/0179769 A1* | 6/2016 | Gershom | G06F 16/958 | 715/235 |
| 2016/0182671 A1* | 6/2016 | Dakhane | H04L 65/605 | 709/219 |
| 2016/0286616 A1* | 9/2016 | van de Ven | H05B 47/16 | |
| 2017/0142459 A1* | 5/2017 | Jarnikov | G06F 3/013 | |
| 2017/0191839 A1* | 7/2017 | Mysen | G01C 21/3484 | |
| 2019/0190971 A1* | 6/2019 | Chen | H04L 65/607 | |
| 2020/0128096 A1* | 4/2020 | Yanagihara | H04L 67/1034 | |

FOREIGN PATENT DOCUMENTS

| | | | | |
|---|---|---|---|---|
| KR | 20100131527 A | * | 12/2010 | D21J 1/00 |
| WO | WO-2006073983 A2 | * | 7/2006 | H04L 67/1095 |
| WO | WO-2015017716 A1 | * | 2/2015 | G06F 16/9535 |
| WO | WO-2015145194 A1 | * | 10/2015 | H04N 21/4405 |

OTHER PUBLICATIONS

"Internet Radio Site iNetRadio.com Launches Unique Music Channels" http://www.radioandmusic.com/content/editorial/news-releases/internet-radio-site-inetradiocom-launches-unique-music-channels.

Ryan Cane; "Stamford Internet Radio App Adds User Music Cloud Hosting" https://www.courant.com/business/hc-xpm-2012-04-18-hc-stamford-intemet-radio-app-adds-user-music-cloud-hosting-20120418-story.html.

"iNetRadio Announces Open Beta Release of Radio-Listening Software" https://www.globenewswire.com/news-release/2013/07/31/988773/0/en/iNetRadio-Announces-Open-Beta-Release-of-Radio-Listening-Software.html.

"New Kid on the Block—iNetRadio" https://www.radioworld.com/news-and-business/new-kid-on-the-block-inetradio.

NetRadio.com home page as of Mar. 11, 2020 http://www.inetradio.com/.

Netradio.com home page as of Feb. 8, 2014 http://www.inetradio.com.

NetRadio.com FAQs page as of Feb. 8, 2014 http://www.inetradio.com/FAQs.php.

NetRadio page on Apple iTunes store as of Mar. 11, 2020 https://apps.apple.com/us/app/inetradio/id365802037.

\* cited by examiner

Traffic & Weather:

| Recent | Cities | All | Add New | Auto Play & Start-Up Play |
|---|---|---|---|---|

720 Auto-Traffic     Auto-Weather 725

Reports near you will play automatically when updated.

Nearby Traffic Reports 705

None within 10 miles

Nearby Weather Reports 710

[Play][Next][Info] New York City, NY
AccuWeather.com

Other Recently Played Reports 715

[Play][Next][Info] New York City, NY
AccuWeather.com

Auto Play (Plays automatically when updated)

[Back] 735

```
<?xml version="1.0" encoding="UTF-8"?>
<rss xmlns:itunes="http://www.itunes.com/DTDS/Podcast-1.0.dtd" version="2.0">
<channel>
<title>New York City, NY - Accuweather.com weather Forecast -</title>
<itunes:author>Accuweather.com</itunes:author>
<link>http://wwa.accuweather.com/index-forecast.asp?zipcode=New%20York%20City,%20NY</link>
<description>New York City, NY - Accuweather.com Forecast</description>
<itunes:subtitle>New York City, NY: Daily Accuweather.com Weather Forecast.</itunes:subtitle>
<itunes:summary>New York City, NY - Daily Accuweather.com Local Weather Forecast</itunes:summary>
<language>en</language>
<copyright>℗ & © 2015 Accuweather.com</copyright>
<itunes:owner>
  <itunes:name>Accuweather.com</itunes:name>
  <itunes:email>podcasting@Accuweather.com</itunes:email>
</itunes:owner>
<itunes:image rel="image" href="http://vortex.accuweather.com/adc2004/podcast/podcast.jpg" >Accuweather.com Podcasts</itunes:image>
<category>News</category>
<itunes:category text="News" />
<itunes:category text="Travel" />
<itunes:explicit>no</itunes:explicit>
<item>
  <title>New York City, NY - Accuweather.com weather Forecast </title>
  <itunes:author>Accuweather.com</itunes:author>
  <description>New York City, NY - Accuweather.com weather Forecast</description>
  <itunes:subtitle>New York City, NY - Accuweather.com weather Forecast </itunes:subtitle>
  <itunes:summary>New York City, NY - Accuweather.com weather Forecast </itunes:summary>
  <enclosure url="http://sirocco.accuweather.com/podcast/LGA_2015-09-10_1255.mp3" type="audio/mp3" length="95896" />
  <guid isPermaLink="false">LGA - 10-Sep-2015 12:55:44.22</guid>
  <pubDate>Thu, 10 Sep 2015 12:55:44 GMT</pubDate>
  <category>News</category>
  <itunes:category text="News" />
  <itunes:explicit>no</itunes:explicit>
  <itunes:keywords>accuweather weather forecast local New York City NY</itunes:keywords>
</item>
</channel>
</rss>
```

FIG. 13

```
<main>
 <title>Philadelphia - I-95</title>
 <creator>GeoTraffic</creator>
 <description>Current Traffic Conditions for Philadelphia - I-95</description>
 -<byFile>
   /home/inetrad/public_html/Geotraffic/updater.php. -UPDATED
 <byFile>
 <image>http://signs.cdn.geotraffic.com/300/241-4.png</image>
 <image150>http://signs.cdn.geotraffic.com/150/241-4.png</image150>
 <image500>http://signs.cdn.geotraffic.com/500/241-4.png</image500>
 <imageShape>square</imageShape>
 <rectImage>add url to rect image here</rectImage>
 <copyright>2015 GEO TRAFFIC</copyright>
 -<element>
 <title>Philadelphia - I-95</title>
 -<mp3file>
   http://media.cdn.geotraffic.com/241/4/raw/audio_report.mp3?c=1441889740791&p=internetwork_052015-xSa249erSA&Expires=1441890345&signature=oUVJQoaqqle~gcJsfW2n02LUJ9EiOhw1PUhY9uiT3x6r9ewpzhUF3aWYUpc0ViP-RzDDGWy2SR1SWna2rry1hkB0g3UGDCUasrQgID0HS5HmOQBdFJposbB9UTumG9Yc1B1-OdpFx3AQdUZjKtV8sAhx6vhhechz8ptuF1QM22674z6LpiiOKRu8Ows8B7gRfRfDCkluF9XmXfyhusMlt38WelulHUy~4J-gNXjoHZL6zXp8q8o5YsrKzC9cPdo7oU5DVII70RjLVzW-L9XEOx5CrVRxEskalOvQXMFko6OT8gCOT8gCOaoFfg4b5S~iJN2Ijv9uhoIc3LykN0pqITPDA__&Key-Pair-Id+APKAIYEIZD6J74RZ5Q7A
 </mp3file>
 <pubDate>1441889740791</pubDate>
 <creator>GeoTraffic</creator>
 <image>http://signs.cdn.geotraffic.com/300/241-4.png</image>
 <description>Current Traffic Conditions for Philadelphia - I-95</description>
 <duration>C38s</duration>
 <infoURL>www.geotraffic.com</infoURL>
 <copyright>2015 GEO TRAFFIC</copyright>
 <element>
<main>
```

FIG. 14

SYSTEM AND METHOD FOR INTERNET RADIO AUTOMATIC CONTENT MANAGEMENT

This application claims priority under 35 U.S.C. § 119 to U.S. Provisional Application No. 62/247,777, filed Oct. 29, 2015, in the United States Patent and Trademark Office.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Content comes in a wide range of forms including: (a) music; (b) news of all kinds including world, national and local events, sports, weather and traffic; (c) podcasts or other broadcasts covering different interests; (d) movies; and (e) any other type of content broadcast over airwaves, satellite, cable, the internet or other connectable sources can be offered to a user through a media player and/or downloaded from links on a website for users to access the programming. Users interested in many different sources of content are faced with having to use a variety of players or links to play content from multiple sources and/or being distributed in different forms and formats. Since these sources are independent, there's no common means to determine when particular content of interest to a particular user is updated. For example, geographically relevant content such as traffic or weather is important to travelers in a particular location. For a traveler planning daily activities and looking for the most current, up-to-date information while they are in a city such as New York City, they must conduct a renewed search for the information at each point in time when it is needed.

The present invention, which may be referred to herein as iNetRadio, solves these issues by aggregating content from any number of sites or broadcasters by letting users set their favorite content to play over the media player automatically when it's updated. This is done by activating an AutoPlay function which automatically checks favorite content for updates. New, unheard content is inserted as the next item to play in the user's iNetRadio playlist and may include any mix of different types of content. AutoPlay eliminates the need for users to keep checking for new content. This allows everything from hourly news updates to weekly podcasts to music selections to play with no manual interaction and without any one content selection interfering with another content selection. Instead, the content is queued sequentially so that all content can be heard in order without one type prevailing over another.

The present invention includes AutoTraffic and AutoWeather features. These features provide travelers who desire local traffic and weather reports with the information they are seeking on the most up-to-date basis, without the distraction of visual traffic maps or the need to search for a local source of information and then wait for the information to be reported. AutoTraffic and AutoWeather functions are activated on the media player by the user. Using geolocation data to find the closest realtime road by road traffic reports (supplied by partner GeoTraffic) or weather reports, this user-specified content is played automatically as updates are provided by content providers.

BRIEF DESCRIPTION OF THE DRAWINGS

For a better understanding of the present invention, and to show more clearly how it functions, reference will now be made, by way of example, to the accompanying drawings. The drawings show embodiments of the present invention in which:

FIG. 7 shows a screenshot of an internet media player that provides a user with the selected city for nearby weather report;

FIG. 13 is an example of an XML file for AccuWeather in the New York area; and

FIG. 14 is an example of an XML file for the I-95 GeoTraffic report in Philadelphia.

DETAILED DESCRIPTION OF THE INVENTION

Figure 1:
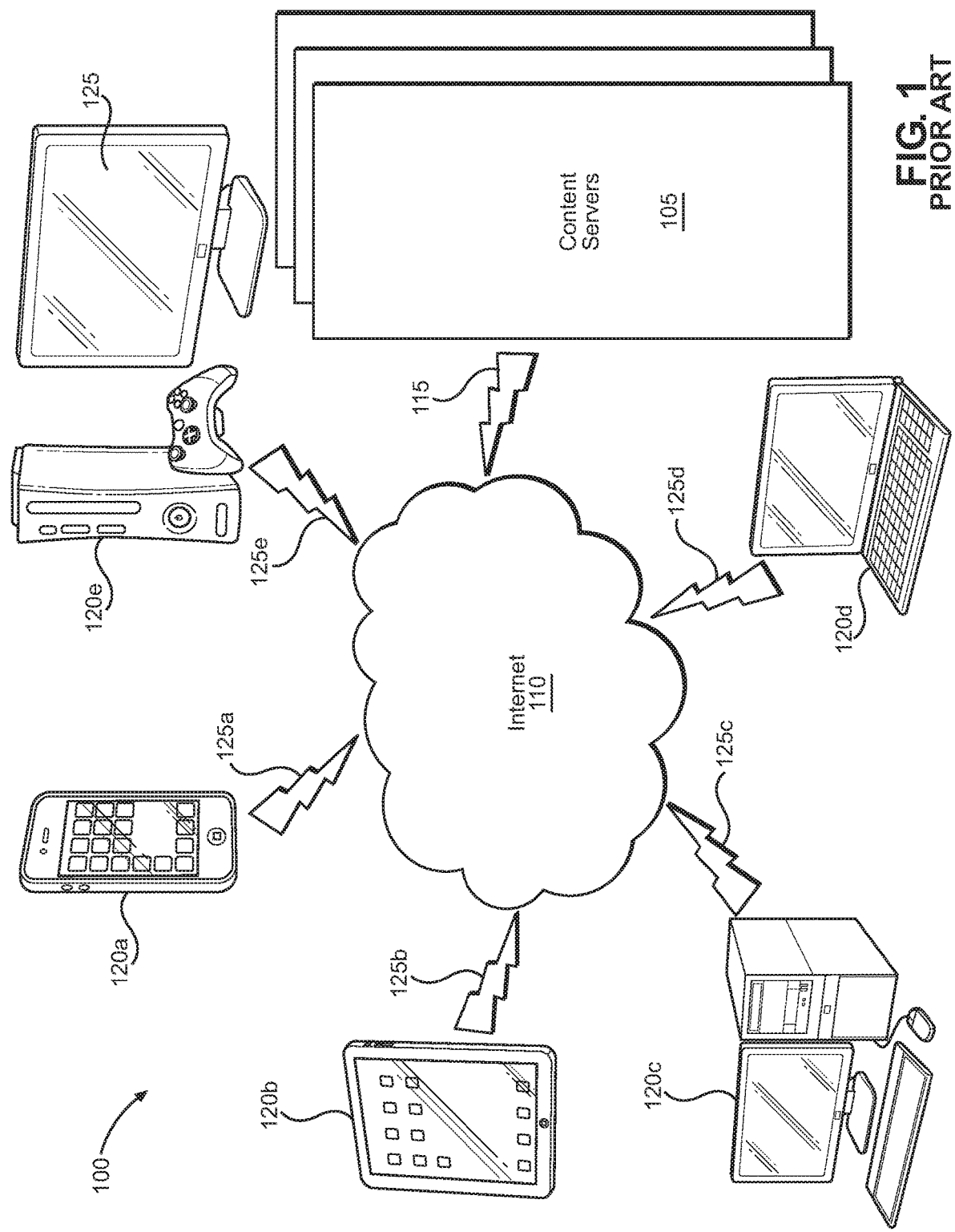
FIG. 1 is a network with one or more servers delivering content to a group of different types of devices.

The present invention will now be described more fully with reference to the accompanying drawings. It should be understood that the invention may be embodied in many different forms and should not be construed as limited to the embodiments set forth herein. Throughout FIGS. 1-14, like elements of the invention are referred to by the same reference numerals for consistency purposes.

FIG. 1 is a system 100 on which a media player residing on one or more devices receives content from one or more content servers 105. Content servers 105 deliver content over network 110 such as the internet that can be widely distributed to any number of devices also connected to network 110. The devices may be in various different forms including but not limited to a smartphone 120a, a tablet computer 120b, a desktop computer 120c, a laptop computer 120d or a gaming device 120e. Each device 120a-e is connected to network 110 through a port 125a-e, respectively. Content servers 105 deliver content of different types including (a) music; (b) news of all kinds including world, national and local events, sports, weather and traffic; (c)

podcasts or other broadcasts of different interests; (d) movies; and (e) any other type of content broadcast over airwaves, satellite, cable, the internet or other connectable sources can be offered to a user through a media player and/or download links on a website for users to access the programming.

Figure 2:
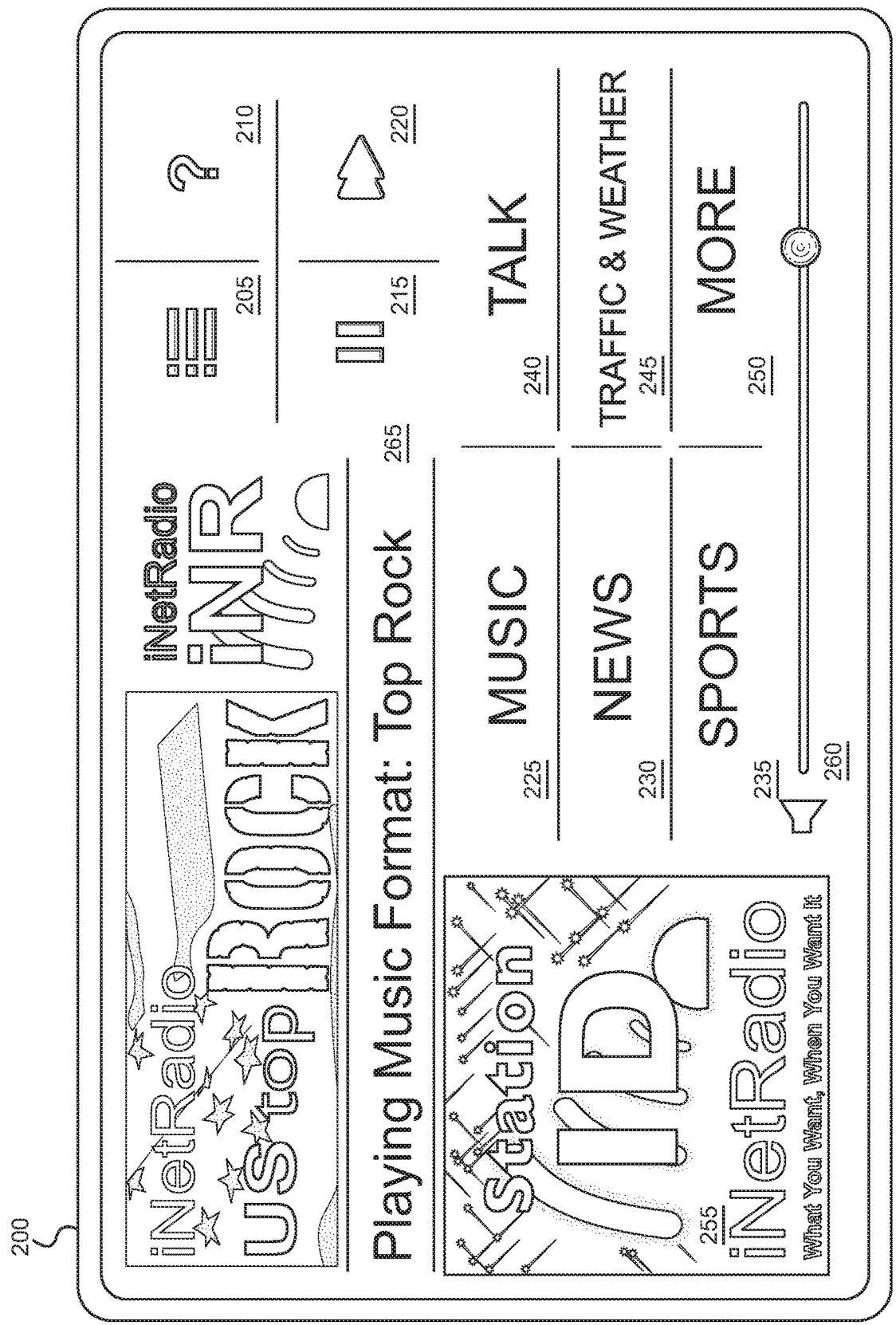
FIG. 2 shows a screenshot of an internet media player.

It should be understood that the media player may be provided on each device 120a-e in a number of different forms. For example, a media player 200 of the type shown in the screenshot of FIG. 2 is one that is linked through a browser such as Firefox, Explorer, Safari or any other standard internet browser on which websites can be viewed. However, media player 200 may also be downloaded to reside locally on a mobile device such as smartphone 120a in the form of a software application or "app." As can be seen in the screenshot of FIG. 2, internet media player 200 includes a variety of buttons or input selectors, including a "listing button" 205, an information button 210, a pause button 215 and a play button 220. Other buttons on the media player 200 include a music selector 225, a news selector 230, a sports selector 235, a talk selector 240, a traffic & weather selector 245 and a more selector 250. A station ID field 255 allows a user to see more information about the current station and a volume control 260 allows a user to adjust the volume. Any of these selectors may be activated, for example, using a keyboard, mouse or trackpad on desktop 120c or laptop 120d, or alternatively using a touchscreen on smartphone 120a or tablet 120b. Other types of inputs may also be used to control media player 200 such as a stylus for use with a touchscreen or multifunction buttons on a handheld game player for use in conjunction with gaming device 125e.

Figure 3:
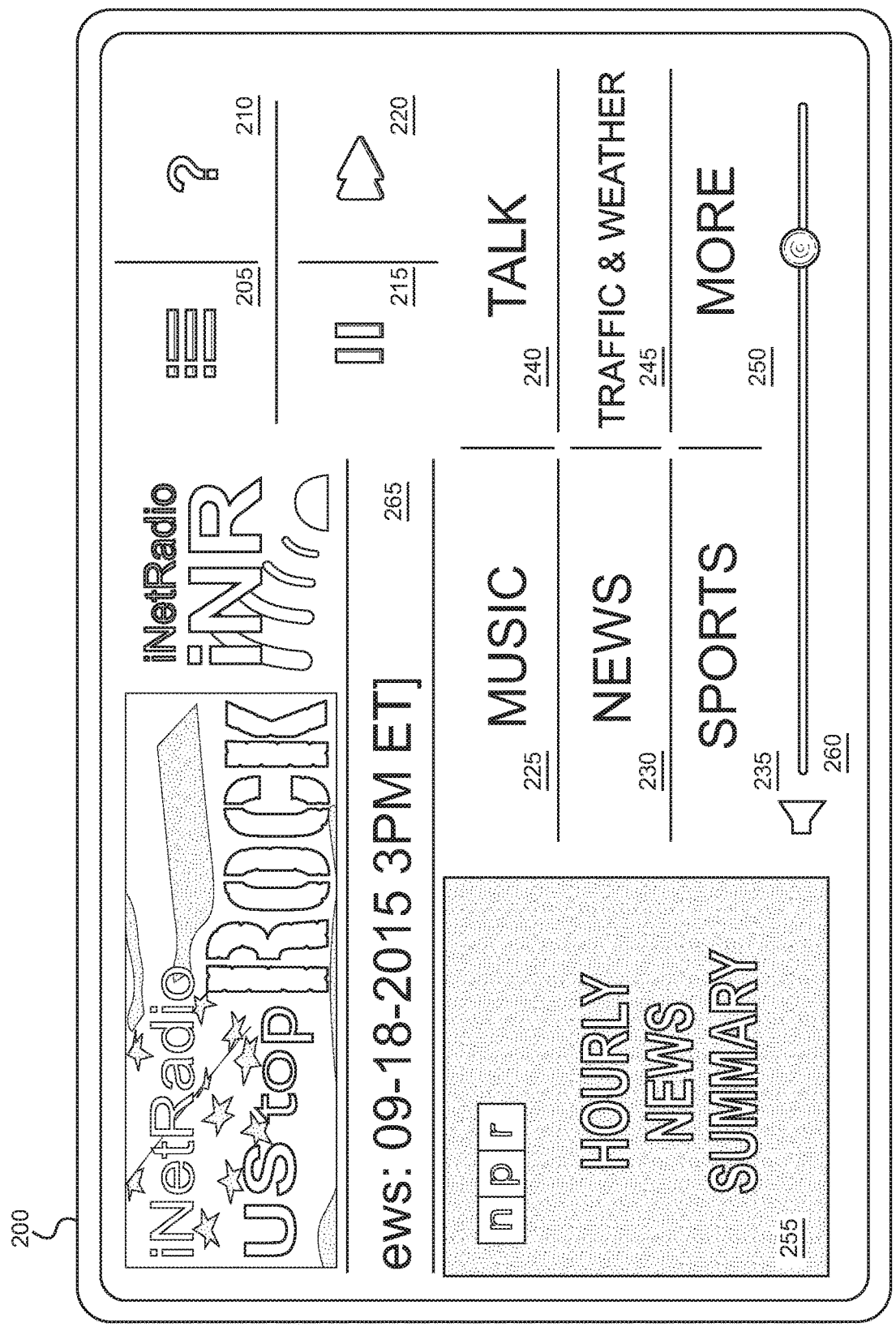
FIG. 3 shows a screenshot of an internet media player that is in the process of playing NPR news content.

FIGS. 3-11 show media player 200 in different operational modes. For example, FIG. 3 shows media player 200 carrying a NPR hourly news summary segment. As can be seen in FIG. 3, station ID field 255 displays the NPR hourly news summary identification block. At the same time, a data field 265 carries current scrolling information about the segment that is playing including the station ID, date and time.

Figure 4:
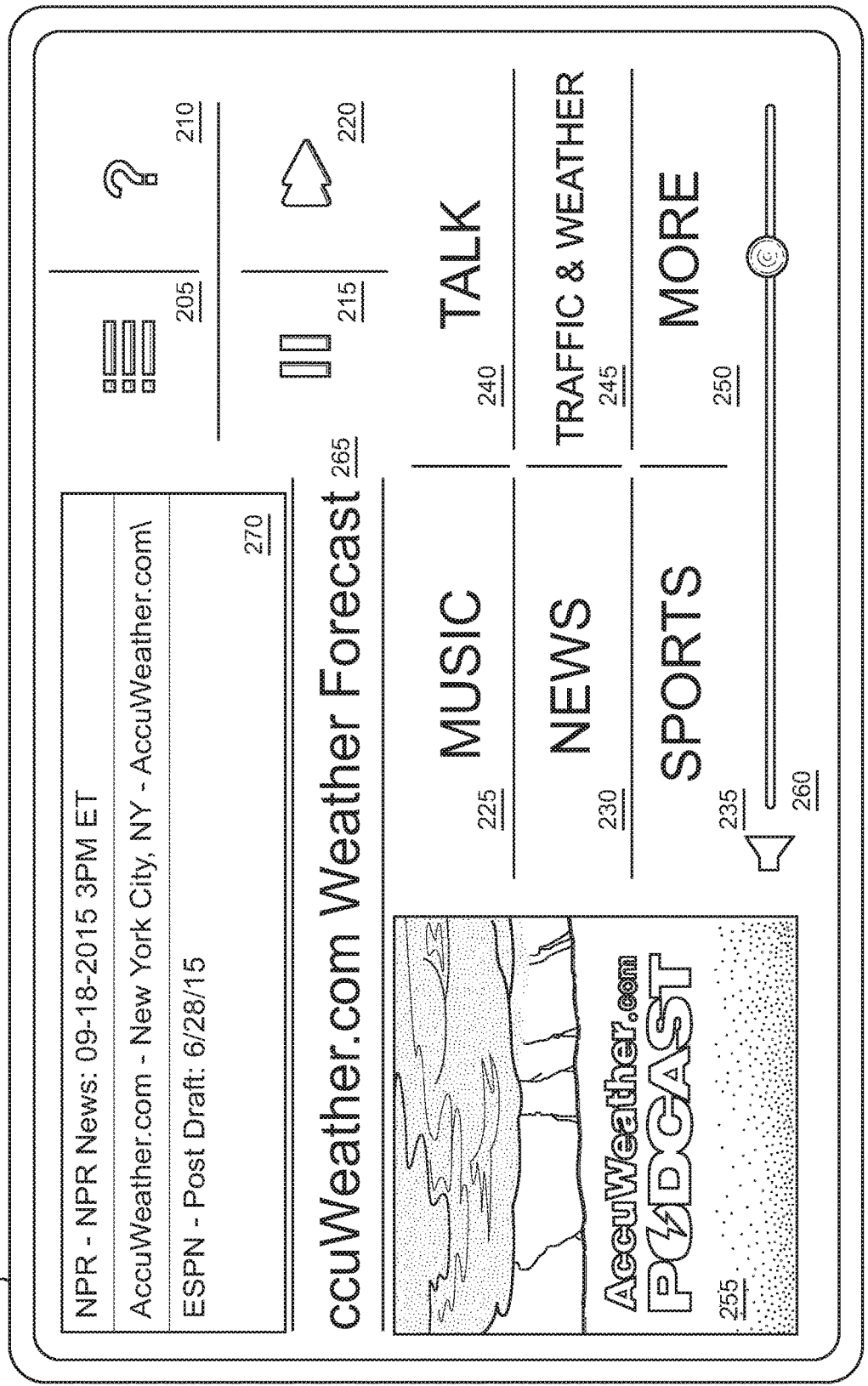
FIG. 4 shows a screenshot of an internet media player that is in the process of playing an AccuWeather podcast.

FIG. 4 shows media player 200 carrying a weather forecast. As can be seen in FIG. 4, station ID field 255 displays an AccuWeather.com podcast identification. At the same time, data field 265 carries current scrolling information about the segment that is playing including the station ID, date and time. History field 270 lists the past segments that have played. The history field is activated by clicking on listing button 205. The history toggles back and forth between the history listing and the iNetRadio broadcast category with each click of listing button 205. If so desired, a user can click on any of the segments listed in the history listing to repeat them.

Figure 5:
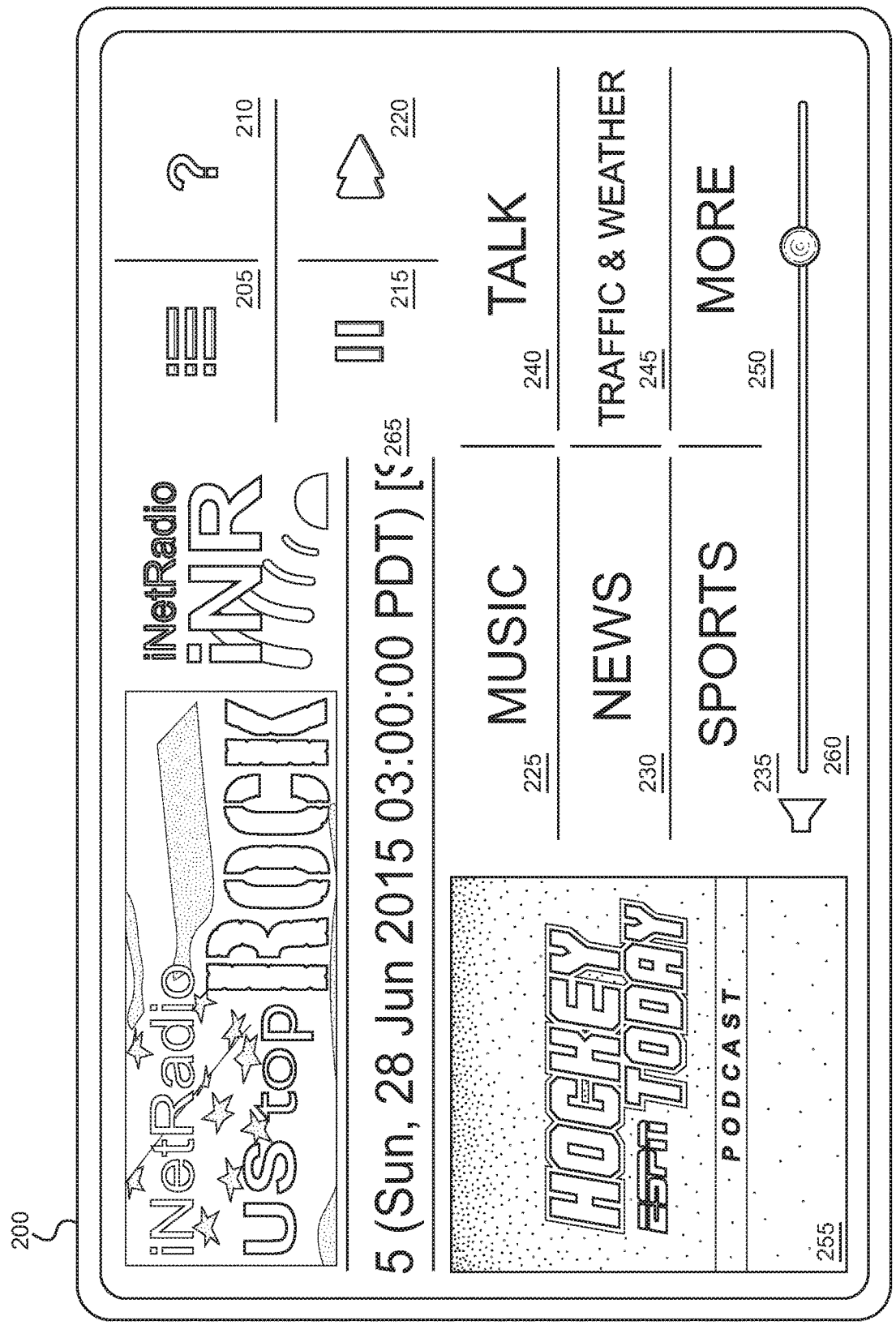
FIG. 5 shows a screenshot of an internet media player that is in the process of playing an ESPN Hockey Today podcast.

FIG. 5 shows media player 200 carrying a sports podcast. As can be seen in FIG. 5, station ID field 255 displays Hockey Today ESPN podcast identification. At the same time, data field 265 carries current scrolling information about the segment that is playing including the station ID, date and time.

Figure 6:
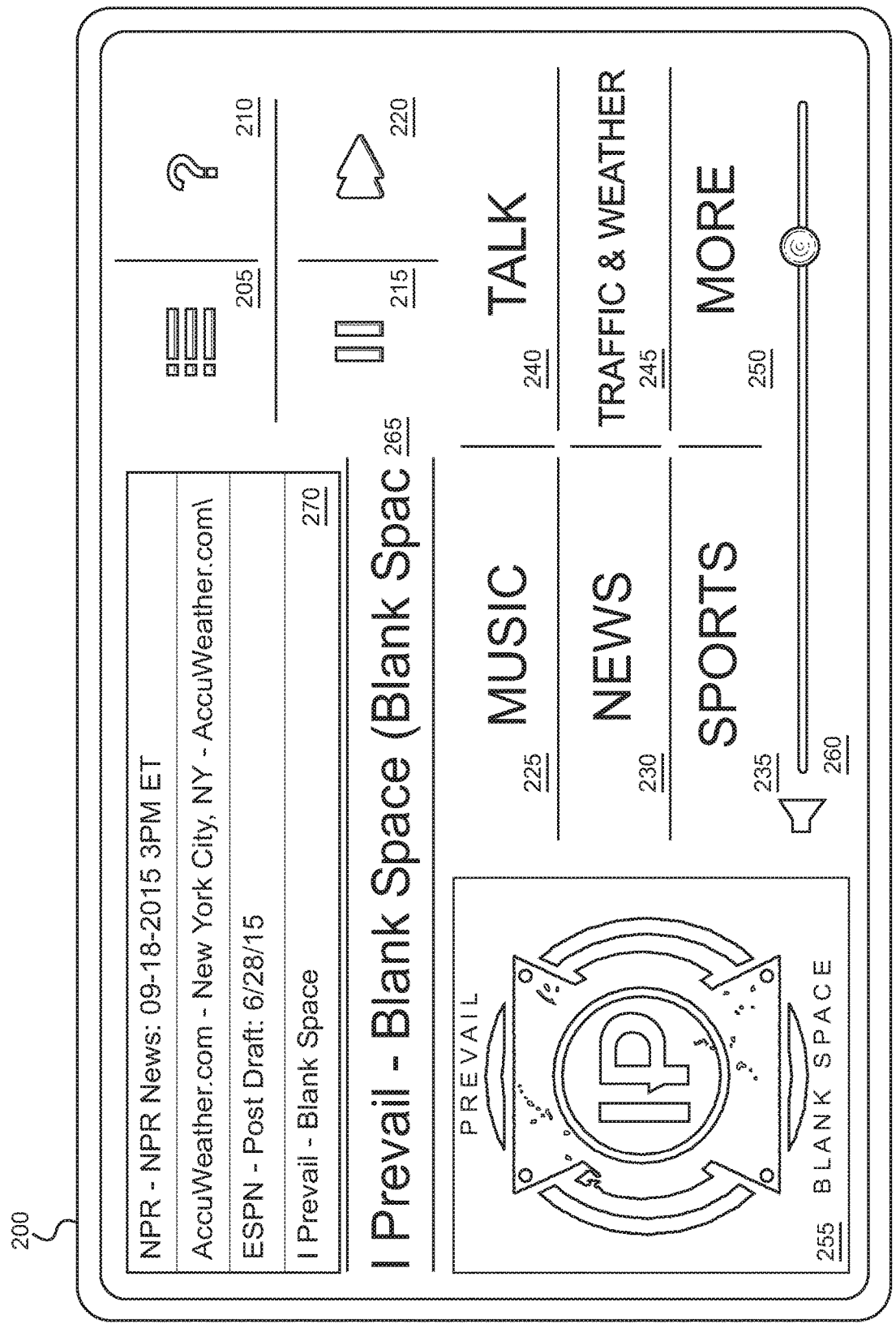
FIG. 6 shows a screenshot of an internet media player that is in the process of playing a song "I Prevail" by the band Blank Space.
Figure 8:
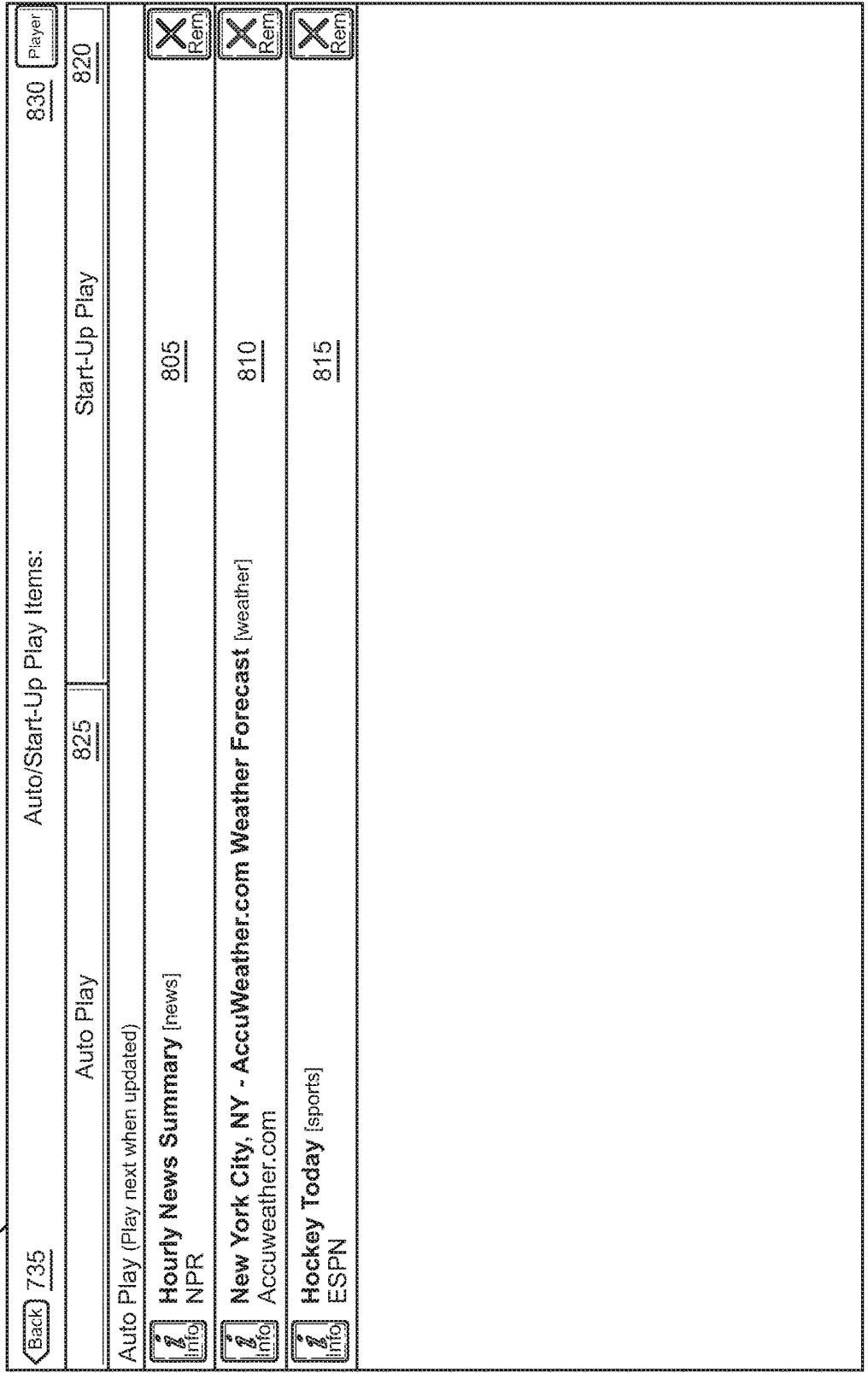
FIG. 8 shows a screenshot of an internet media player with a listing of Auto/Start-Up Play Items.

FIG. 6 shows media player 200 playing music. As can be seen in FIG. 6, station ID field 255 shows the name of the song "I Prevail" by the band "Blank Space." At the same time, data field 265 carries current scrolling information about the segment that is playing including the station ID, date and time. History field 270 lists the past segments that have played.

FIG. 7 shows media player 200 after the "traffic & weather" selector 245 has been clicked. As can be seen in FIG. 7, separate lists are displayed for nearby traffic reports 705 (none within 10 miles), nearby weather reports 710 (New York City, N.Y.), and other recently played reports 715 (New York City, N.Y.). A user can select or unselect an "Auto-Traffic" button 720 and/or an "Auto-Weather" button 725. When either or both of these buttons are selected, a check mark appears next to them as shown in FIG. 7. Selecting Auto-Traffic means that anytime there is an updated traffic report within the local area (default of 10 mile radius), the traffic report will be loaded in media player 200 and played next in the queue. Selecting Auto-Weather will likewise play a local weather report when it becomes available. It should be understood that a 10 mile radius is set as the default in media player 200 as shown, but the definition of "local" to cover a larger or smaller area can be set either by the user or the developer of media player 200. Selecting an "Auto-play & Start-up Play" button 730 takes the user to a new media player screen shown in FIG. 8 that provides a list of auto-play items that will be automatically queued by media player 200 when they become available as requested by the user. When the user is on the screen of FIG. 7, he may go to the previous screen by clicking the "back" button 735.

Figure 9:
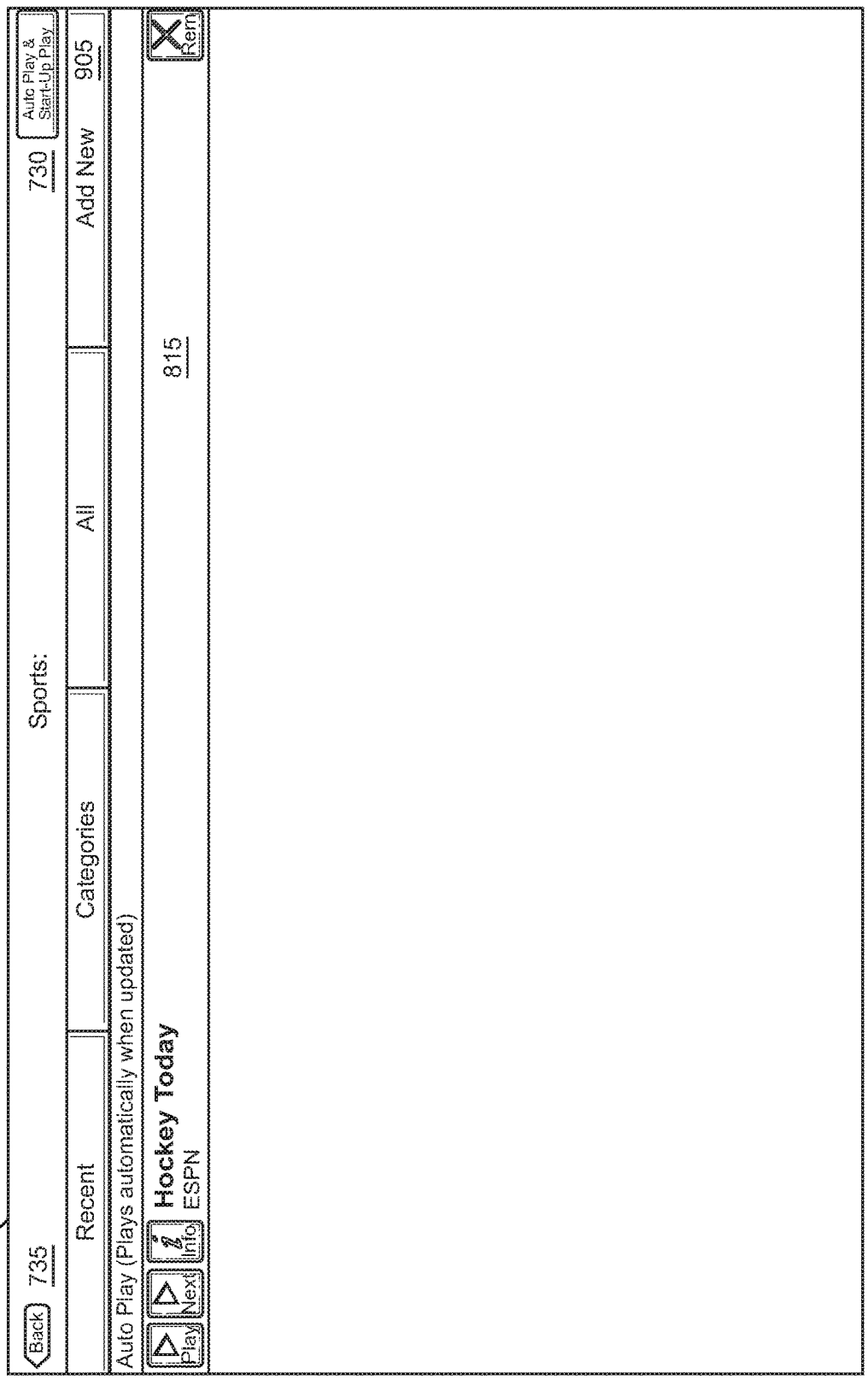
FIG. 9 shows a screenshot of an internet media player that provides a user with the selected content in the sports category.

FIG. 9 shows media player 200 displaying a list of sports items selected by a user to be included in the user's playlist. As can be seen in FIG. 9, ESPN's Hockey Today 815 is the only item in the playlist. Additional sports podcasts may be added by clicking on an "Add New" header button 905. Upon doing so, a user is presented with a text box to enter a URL for the new podcast to be included in the playlist. A user may also click on header button labeled "Categories" or 910 or "All" 915 to make other selections to be added to the playlist. The user may go back to the Start-Up Play and Auto Play by clicking on Auto Play & Start-up Play button 730. To return to a screen showing the media player, the user clicks on "back" button 735.

Figure 10:
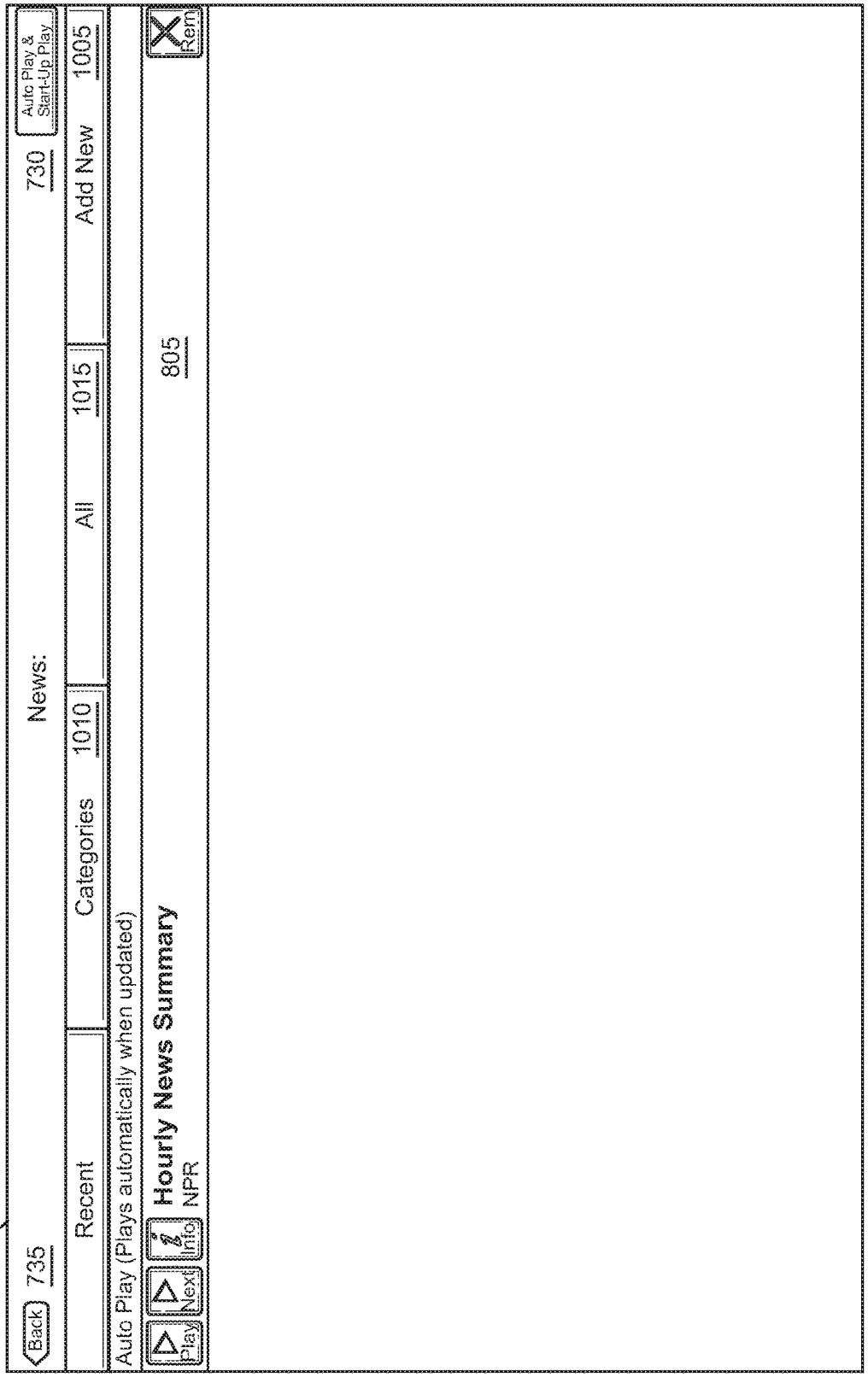
FIG. 10 shows a screenshot of an internet media player that provides a user with the selected content in the news category.

FIG. 10 shows media player 200 displaying a list of news items selected by a user to be included in the user's playlist. As can be seen in FIG. 10, NPR's Hockey Hourly News Summary 815 is the only item in the playlist. Additional news items may be added by clicking on an "Add New" header button 1005. Upon doing so, a user is presented with a text box to enter a URL for the new podcast to be included in the playlist. A user may also click on header button labeled "Categories" or 1010 or "All" 1015 to make other selections to be added the playlist. The user may go back to the Start-Up Play and Auto Play by clicking on Auto Play & Start-up Play button 730. To return to a screen showing the media player, the user clicks on "back" button 735.

Figure 11:
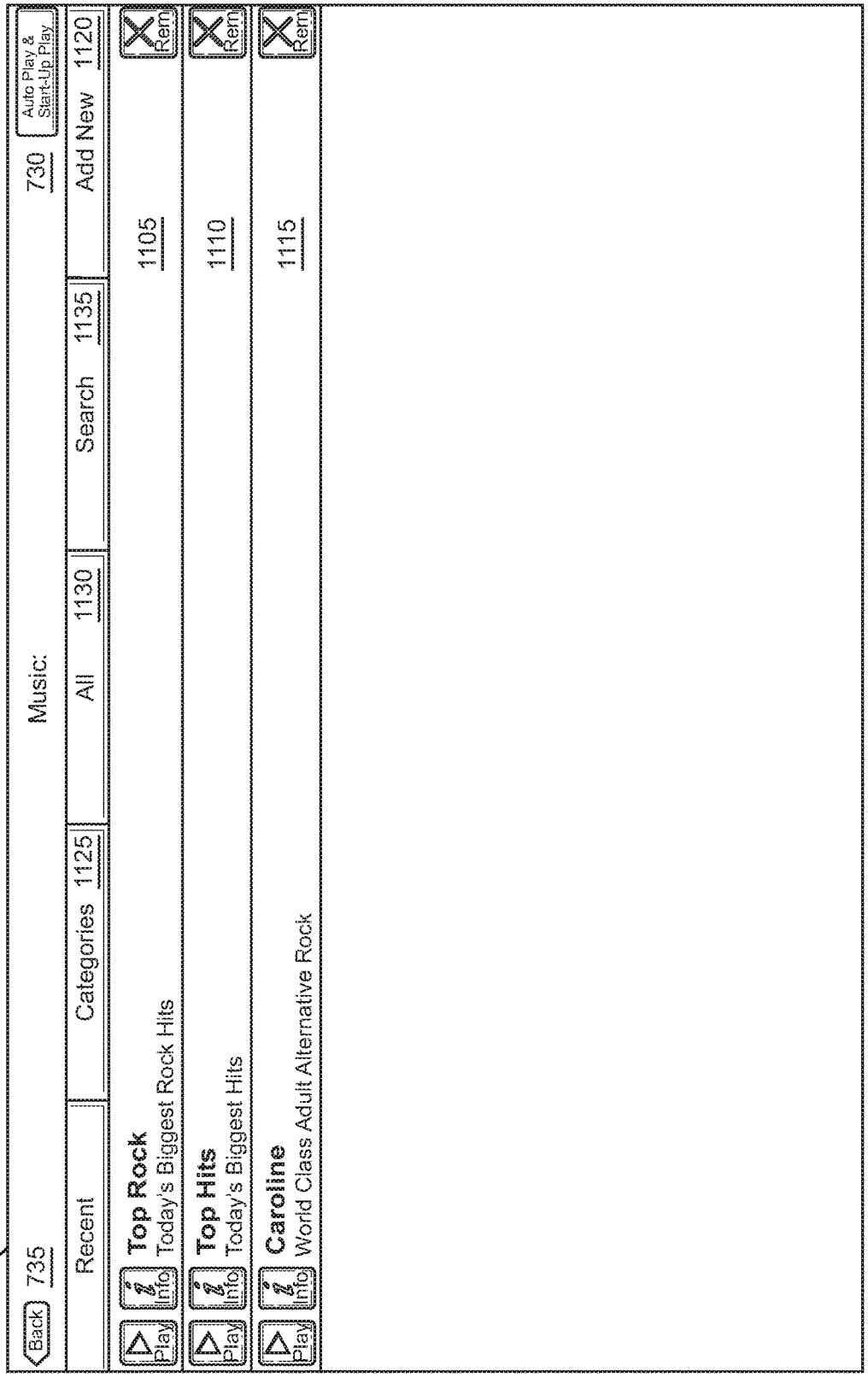
FIG. 11 shows a screenshot of an internet media player that provides a user with the selected content in the music category.

FIG. 11 shows media player 200 displaying a list of music items selected by a user to be included in the user's playlist. As can be seen in FIG. 11, the list includes "Top Rock" 1105, "Top Hits" 1110 and "Caroline" 1115. Additional music items may be added by clicking on an "Add New" header button 1120. Upon doing so, a user is presented with a text box to enter a URL for the new podcast to be included in the playlist. A user may also click on header button labeled "Categories," 1125, "All" 1130 or "Search" 1135 to make other selections to be added to the playlist. The user may go back to the Start-Up Play and Auto Play by clicking on Auto Play & Start-up Play button 730. To return to a screen showing the media player, the user clicks on "back" button 735.

Figure 12:
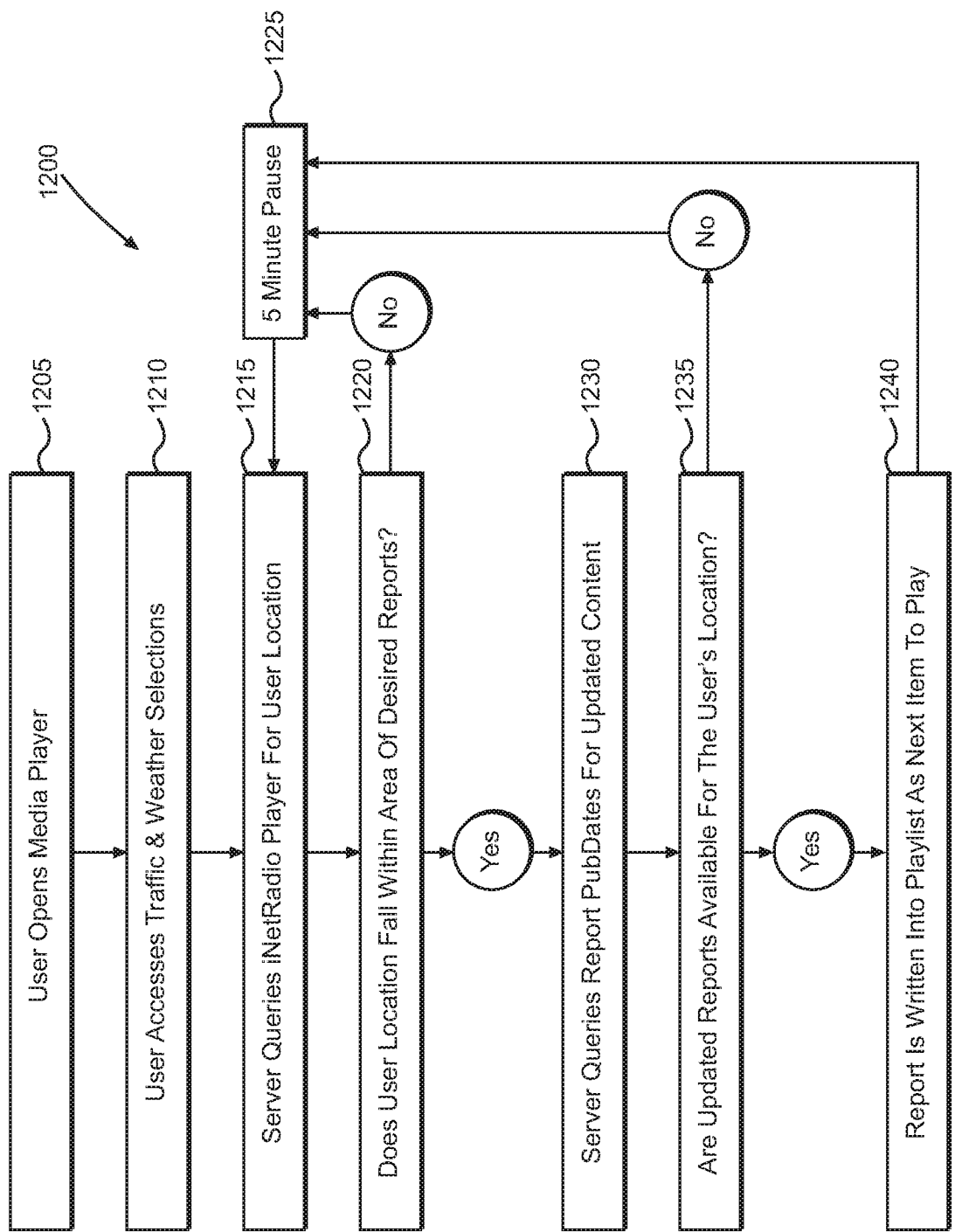
FIG. 12 is a flowchart of the process for selecting Auto-Traffic and AutoWeather content to be played on the media player.

FIG. 12 is a flowchart 1200 of the process for selecting AutoTraffic and AutoWeather content to be played on the media player 200. Initially, the user opens media player 200 at step 1205. Once media player 200 is open, the user clicks traffic & weather button 245 to access the Traffic & Weather page (See FIG. 7). The server on which iNetRadio is operating then queries the iNetRadio media player 200 running on the user's device to determine the particular location of the device at step 1215. It is then determined whether the user location is within an area of desired reports for traffic and weather at step 1220. If not, there is a 5 minute pause at step 1225 before the iNetRadio media player 200 is queried again after returning to step 1215. In this way, there will be an endless wait period until the user enters a location where reports are available. If the user is within an area of desired reports at step 1220, then the server queries report the publication dates for updated content at step 1230 and it is determined whether any updated reports are available for the user's location at step 1235. If not, there is a 5 minute pause at step 1225 again before the iNetRadio media player 200 is queried again after returning to step 1215. In this way, there will be an endless wait period until the user enters a location where reports are available. If there are updated reports available for the user's location, the report is written into the playlist as the next item to play at step 1240.

A feature of the invention is that any item added to the sequential playlist is selected by the user. The selection process for an item, particularly for an item that is geographically based such as content related to weather or traffic is prioritized by the user in the selection process. So, for example, the user may set the player to play an updated traffic or weather report for a particular location immediately upon receipt and interrupting any content that is currently being played. Or, the user may set the player to play an updated traffic or weather report only after completing the content item that is currently playing. In that case, if a song or podcast is playing, the weather report or traffic report would be played after the current item reaches its endpoint. Alternatively, it is possible to inform the user that a new update is available by displaying a notice on the media player that an update is available. That way, the user can decide immediately whether to continue listening to the current selection or stop the current selection to get the update. The notice may be in the form of a textual message on the player, or it may be in the form of a highlighted area on the player, or it can be an alarm sound such as a ping alerting the user to the update.

It will be understood that the type of networks 110 over which content is delivered and other functionality is handled may be one of several different types of networks. These include a Local Area Network (LAN), Wide Area Network (WAN), an intranet, the internet or other classes of networks. Any type of network technology could be used without departing from the principles of the invention. This would include communication via any protocol on any of the layers of the OSI model (ISO/IEC 7498-1) with or without encryption (e.g. SSL encryption, VPN, etc).

FIG. 13 is an example of an XML file for AccuWeather in the New York area. The <pubDate> tag contains a timestamp provided by the content provider (Thu, 10 Sep. 2015 12:55:44 GMT) which is compared to the database record for this content source from the last detected update. If the <pubDate> data indicates that the content has been updated, the AutoPlay function edits the user's playlist and schedules the updated content to play as the next item.

Example: A user listens to the "iNetRadio 80s Hits" channel all day at work and has BBC World News and AccuWeather NYC set to AutoPlay. Launching the iNetRadio media player 200 generates a music playlist that will play the selected music channel until the AutoPlay function detects that either the news or weather content has updated. The updated content is then scheduled into the playlist as the next item and will play after the current song (or other content) has finished.

The AutoPlay function provides iNetRadio users with a completely automatic entertainment and information system using sources that can be combined in any desired way.

FIG. 14 is an example of an XML file for the I-95 GeoTraffic report in Philadelphia. In this example, the <pubDate> tag contains a purely numeric string that is used for comparison to detect updated content. If a user has this set to AutoPlay (see FIG. 7 where both Auto-Traffic and Auto-Weather are checked), the report would be inserted into the user's playlist whenever it is updated.

If a user has AutoTraffic activated, the system additionally uses the user's location (latitude and longitude) derived from geolocation services to choose the closest reports (within 10 miles). The relevant location for each report is determined by GeoTraffic, the creator of the reports. The AutoPlay function then checks for updated content and inserts it as the next item to play.

AutoWeather works similarly to AutoTraffic by locating the closest forecast location to the user, although the range (radius) is typically significantly greater.

The screenshot of FIG. 7 shows AutoTraffic selected and NYC area weather selected to AutoPlay. If traveling between cities, the user would hear traffic reports dynamically follow their location but the weather source would remain for NYC.

Any variation and derivation from the above description and drawings are included in the scope of the present invention as defined by the claims.

What is claimed is:

1. A system to play a user-defined playlist including certain selected items of content to play, the system comprising:
    a plurality of external content providers;
    a server;
    a computing device in communication with the server over a network and connected to receive content from the plurality of external content providers, each content file including a publishing date provided by a corresponding one of the external content providers;
    a user interface on the computing device through which a user controls the computing device;
    a media player operating on the computing device to play the content in the user-defined playlist, the user-defined playlist including the content received from the plurality of external content providers, the media player being controlled by the user interface;
    at least one auto-content selector function selectable from the media player and configured to determine when updated content from the plurality of external content providers is available and provide a user with unheard updates to content in the user-defined playlist, the updated content comprising newly available content provided by the plurality of external content providers, the at least one auto-content selector function being configured to automatically add the newly available updated content to the user-defined playlist as a next item of content to be played based on the determined availability of the updated content and on detected information about the user;
    wherein the updates are provided for content from selected ones of the plurality of external content providers, the selected external content providers having been pre-selected by the user;
    wherein the at least one auto-content selector function is configured to initiate a server query for each of the selected external content providers to determine the availability of updated content, each server query reporting the publishing date included in the most recently available content file provided by the corresponding selected external content provider;

wherein the at least one auto-content selector function is configured to compare the publishing date reported by each server query to a database record for the corresponding one of the plurality of external content providers, each database record including the publishing date of the last detected update from the corresponding external content provider;

wherein the at least one auto-content selector function is configured to determine that updated content is available from one of the plurality of external content providers when the publishing date reported by the most recent server query for the external content provider is different from the publishing date included in the corresponding database record;

wherein the update content is automatically played on the media player for the user in the user-defined playlist; and wherein the updated content that is played on the media player for the user in the user-defined playlist is played in an order according to a priority set by the user.

2. The system of claim 1 wherein the media player is linked through an internet browser.

3. The system of claim 1 wherein the media player resides locally on a mobile device.

4. The system of claim 1 wherein the detected information about the user comprises geolocation information.

5. The system of claim 1 wherein the user is alerted to a content update using a notification.

6. The system of claim 5 wherein the notification is in text form.

7. The system of claim 5 wherein the notification is a visual notification.

8. The system of claim 5 wherein the notification is an audible notification.

9. The system of claim 1 wherein items automatically added to the user-defined playlist are played after the current content being played is completed.

10. The system of claim 1 wherein items automatically added to the user-defined playlist are played immediately upon receipt, interrupting any content that is currently being played.

11. The system of claim 1 wherein the updated content comprises weather.

12. The system of claim 1 wherein the updated content comprises traffic.

13. The system of claim 1, wherein the at least one auto-content selector function is configured to automatically add the newly available updated content to the user-defined playlist according to preset user preferences for each external content provider.

14. The system of claim 1, wherein the publishing date included in each content file comprises timestamp data provided by the corresponding external content provider, the timestamp data indicating when the content file was last published by the corresponding external content provider.

15. A system to play a user-defined playlist including certain selected items of content to play, the system comprising:

a plurality of external content providers;
a server;
a computing device in communication with the server over a network and connected to receive content from the plurality of external content providers, each content file including a publishing date provided by a corresponding one of the external content providers;

a user interface on the computing device through which a user controls the computing device;

a media player operating on the computing device to play the content in the user-defined playlist, the user-defined playlist including the content received from the plurality of external content providers, the media player being controlled by the user interface;

at least one auto-content selector function selectable from the media player and configured to determine when updated content from the plurality of external content providers is available and provide a user with updates to content in the user-defined playlist, the updated content comprising newly available content provided by the plurality of external content providers, the at least one auto-content selector function being configured to automatically add the newly available updated content to the user-defined playlist as a next item of content to be played based on detected information about the user;

wherein the updates are provided for content from selected ones of the plurality of external content providers, the selected external content providers having been pre-selected by the user;

wherein the updated content is played on the media player for the user in the user-defined playlist in an order according to a priority set by the user;

wherein the at least one auto-content selector function is configured to initiate a server query for each of the selected external content providers to determine the availability of updated content, each server query reporting the publishing date included in the most recently available content file provided by the corresponding selected external content provider;

wherein the at least one auto-content selector function is configured to compare the publishing date reported by each server query to a database record for the corresponding one of the plurality of external content providers, each database record including the publishing date of the last detected update from the corresponding external content provider; and wherein the at least one auto-content selector function is configured to determine that updated content is available from one of the plurality of external content providers when the publishing date reported by the most recent server query for the external content provider is different from the publishing date included in the corresponding database record.

16. The system of claim 15 wherein the detected information about the user comprises geolocation information.

17. A system to play a user-defined playlist including certain selected items of content to play, the system comprising:

a plurality of external content providers;
a server;
a computing device in communication with the server over a network and connected to receive content from the plurality of external content providers, each content file including a publishing date provided by a corresponding one of the external content providers;

a user interface on the computing device through which a user controls the computing device; a media player operating on the computing device to play the content in the user-defined playlist, the user-defined playlist including the content received from the plurality of external content providers, the media player being controlled by the user interface;

at least one auto-content selector function selectable from the media player and configured to determine when updated content from the plurality of external content providers is available and provide a user with updates to content in the user-defined playlist, the updated content comprising newly available content provided by the plurality of external content providers, wherein the updates are provided for content from selected ones of the plurality of external content providers, the selected external content providers having been pre-selected by the user;

wherein the at least one auto-content selector function is configured to initiate a server query for each of the selected external content providers to determine newly available updates, each server query reporting the publishing date included in the most recently available content file provided by the corresponding selected external content provider;

wherein the at least one auto-content selector function is configured to compare the publishing date reported by each server query to a publishing date of the last detected update from the corresponding external content provider;

wherein the at least one auto-content selector function is configured to determine there is a newly available update from an external content provider when the server query for the external content provider reports a publishing date that is more recent than a publishing date of the last detected update from the corresponding external content provider;

wherein the at least one auto-content selector function is configured to automatically add newly available updates to the user-defined playlist as a next item of content to be played; and wherein the updated content is played on the media player for the user in the user-defined playlist in an order according to a priority set by the user.

18. The system of claim 17 wherein the at least one auto-content selector function is configured to determine new updates are available by comparing the publishing date reported by each server query to a database record for the corresponding one of the plurality of external content providers, each database record including the publishing date of the last detected update from the corresponding external content provider.

19. The system of claim 17 wherein the publishing date is a date and/or time identifier contained within RSS or XML control files of the content from the selected ones of the plurality of external content providers.

* * * * *